(12) United States Patent
Thompson et al.

(10) Patent No.: US 7,542,945 B2
(45) Date of Patent: Jun. 2, 2009

(54) AUTHENTICATION DEVICE, SYSTEM AND METHODS

(75) Inventors: Gregory K. Thompson, Huntsville, AL (US); Terry W. Gardner, Moulton, AL (US); Jimmy Smith, Lacey's Spring, AL (US); Ron Mills, Huntsville, AL (US)

(73) Assignee: Sanmina-SCI Corporation, San Jose, CA (US)

( * ) Notice: Subject to any disclaimer, the term of this patent is extended or adjusted under 35 U.S.C. 154(b) by 888 days.

(21) Appl. No.: 10/346,402

(22) Filed: Jan. 15, 2003

(65) Prior Publication Data

US 2004/0135801 A1    Jul. 15, 2004

(51) Int. Cl.
*G06F 17/00* (2006.01)

(52) U.S. Cl. .............. 705/64; 705/1; 705/10; 705/14; 705/33; 705/35; 235/381

(58) Field of Classification Search .......... 705/1, 705/51, 64
See application file for complete search history.

(56) References Cited

U.S. PATENT DOCUMENTS

| | | | |
|---|---|---|---|
| 4,570,223 A | 2/1986 | Yoshimoto | |
| 5,450,319 A | 9/1995 | Ishikawa et al. | |
| 6,230,928 B1 * | 5/2001 | Hanna et al. | 221/13 |
| 6,268,788 B1 * | 7/2001 | Gray | 340/5.2 |
| 6,270,011 B1 | 8/2001 | Gottfried | |
| 6,307,956 B1 | 10/2001 | Black | |
| 6,400,836 B2 * | 6/2002 | Senior | 382/124 |
| 6,522,772 B1 * | 2/2003 | Morrison et al. | 382/124 |
| 6,612,928 B1 * | 9/2003 | Bradford et al. | 463/29 |
| 6,720,712 B2 * | 4/2004 | Scott et al. | 310/339 |
| 6,883,709 B2 * | 4/2005 | Joseph | 235/381 |
| 6,983,061 B2 * | 1/2006 | Ikegami et al. | 382/115 |
| 2002/0035542 A1 | 3/2002 | Tumey et al. | |
| 2003/0061172 A1 * | 3/2003 | Robinson | 705/67 |
| 2003/0163709 A1 | 8/2003 | Milgramm et al. | |
| 2003/0168509 A1 | 9/2003 | Nielsen et al. | |

FOREIGN PATENT DOCUMENTS

| | | |
|---|---|---|
| EP | 0991027 A2 | 4/2000 |
| WO | WO 01/40907 A2 | 6/2001 |

OTHER PUBLICATIONS

PCT/US04/00697 International Search Report issued May 5, 2005.
PCT/US2004000697 International Search Report issued Aug. 21, 2006.

* cited by examiner

*Primary Examiner*—Calvin L Hewitt, II
*Assistant Examiner*—John M Winter
(74) *Attorney, Agent, or Firm*—Wilson Sonsini Goodrich & Rosati

(57) ABSTRACT

System terminal integrated with biometric sensor, such as a fingerprint sensor. Transaction terminal such as a point of sale system, automated teller machine (ATM) or other system. The system may include a touch screen display. Also, logic to process sales transactions may be included. The transaction terminal may include a cash drawer. The system authenticates users based on data from the sensor, and can regulate access, for example to a cash drawer, based on the authentication. Also described is a sensor module, security system, and method of operating a transaction terminal.

5 Claims, 13 Drawing Sheets

AUTHENTICATION DEVICE, SYSTEM AND METHODS

BACKGROUND OF THE INVENTION

1. Field of the Invention

The present invention relates to the field of system security.

2. Background

Controlling access to systems is an important consideration. The control of access and system security is important in order to prevent theft and to maintain system integrity and accuracy. For example, in the retail environment, it is important to control access to a point of sale terminal. To prevent theft from such systems, it is important to implement measures to prevent access by outsiders. Additionally, it can be important to restrict and monitor access and use even among the various personnel in an organization.

Various approaches have been used to increase system security. Prior systems have employed keys, identification cards with magnetic strips, personal identification numbers and other solutions to restrict access and, in some cases, monitor certain activities.

Even with the benefit of existing systems, organizations still face threats to the security of their systems and high costs of implementing and maintaining the systems. Thus, there exists a need for improved systems and methods for system access control and security.

SUMMARY

An embodiment of the invention is directed to a system terminal integrated with a biometric sensor. One embodiment of the invention includes a transaction terminal such as a point of sale system. Such system may include a touch screen display. Also included are electronics and/or software logic to process sales transactions. The sales processing logic is coupled to the display and is configured to display information related to sales transactions at least partially in response to touch on the screen. The transaction terminal may include a cash drawer. The biometric sensor is coupled to the display. The sensor may comprise a human fingerprint reader. The system authenticates users based on comparison of information received from the sensor with previously obtained information associated with the users. In one embodiment, the system allows access to the cash drawer in response to a determination that a user is authenticated. An indicator, such as a light emitting diode (LED), may be included to indicate that a user has been authenticated.

The sensor may be placed in various locations. For example, in one implementation, the sensor is located on a frame surrounding the screen of the display. In another implementation, the sensor is located in a position allowing the user to continue to view the screen while placing a finger on the sensor. In another implementation, the sensor is located on a portion of the display lower than the screen. The sensor may be centered substantially laterally on the portion of the display lower than the screen. In yet another implementation, the sensor is located on a portion of the display to the user's right hand side of the screen. A second sensor may be included in the system. The second sensor, according to one implementation, is located on a portion of the display to the user's left hand side of the screen. The second sensor is located so that the user can place a finger from a left hand on the second sensor while continuing to view the screen. Other items may be included in the system in addition to the display. For example, in one embodiment a scanner is coupled with the logic to process sales transactions.

The sensor may comprise a sensor capable of receiving biometric data. For example, the sensor may comprise a solid state capacitive sensor. According to one implementation, the sensor yields an image having a density of at least five hundred dots per inch (dpi).

The transaction terminal may comprise different systems according to various embodiments of the invention. For example, the transaction terminal may comprise an automated teller machine (ATM). The transaction terminal may also comprise a system used for security at a boarding gate in an airport terminal. Embodiments of the invention may also be applied to a lock mechanism in a building, such as a residential front door lock mechanism. In various aspects of the invention, access to specific services may be granted only to an authenticated user. For example, unless a customer has previously supplied biometric fingerprint data to a banking institution, the customer may be limited to a selected set of ATM functions. Thus, according to an embodiment, the system designates particular ATM functions that are allowed for the customers of the financial institution (such as, for example, customers that have an account at the institution) and the system allows a limited set of other functions or subset of functions for non-customers.

Another embodiment of the invention is directed to a transaction terminal including a computer processor. The transaction terminal includes a display including a touch screen and logic to process transactions. The logic is coupled to the display and programmed to display information related to sales transactions at least partially to response to input from the touch screen. The system includes a sensor capable of receiving information from a human fingerprint. The sensor is coupled to the display. Also included is storage and logic to authenticate users based on comparison of information received from the sensor with information in the storage associated with the users. The computer processor is operative with the logic to process sales transactions, as well as with the logic to authenticate users and the storage.

According to one implementation, the logic programmed to process sales transactions includes a computer software program operable on the computer processor. According to another implementation, the logic to authenticate users is not included within the logic programmed to process sales. According to yet another implementation, the logic to authenticate users does not communicate with the logic to process sales. However, in another implementation, the logic to authenticate users is operable in response to the logic to process sales. In yet another implementation, the logic to authenticate users is included within a computer software program that helps to process sales transactions.

According to one implementation, the system includes a cash drawer and logic to allow access to the cash drawer. The logic to allow access to the cash drawer may include logic programmed to allow access to the cash drawer in response to a determination that a user is authenticated. The logic to allow access to the cash drawer may include programmable logic. The system may include bios instructions to cause the programmable logic to allow access to the cash drawer in response to a positive determination by the logic to authenticate users. The logic to allow access to the cash drawer may comprise a field programmable gate array (FPGA).

Another embodiment of the invention is directed to a transaction terminal including logic to provide permissions to users based on information received from a fingerprint sensor and information stored about users in a database. The system includes a touch screen display and logic to process sales transactions. The sensor is coupled to the display. The logic is programmed to display information related to the sales transactions at least partially in response to input from the touch screen.

The system may include logic for particular operations operable only by authenticated users who are a member of a particular class, such as supervisor users, as determined by information in the database. The system may include logic that requires different steps for enrollment of supervisor users than steps required for enrollment of at least some other users. The particular operations may include enrollment of the users, according to one embodiment of the invention. The particular operations may also include override of a sales transaction. Another kind of particular operation may also, or alternatively, include access to a cash drawer.

Information about the users may include employee identification numbers, history of access to the system, and other information about the users. The system may also include logic to store history of operation of system and information received from the sensor in connection with the operation. The system may include a log file to store the history.

Another embodiment of the invention is directed to a sensor module. Included is a housing configured to attach to a display. A fingerprint sensor and indicator output are positioned in the housing. The indicator output is positioned in the housing such that, when the housing is attached to the display, a user can view graphics on the display and the indicator output. The interface included in the module is configured to communicate with a processor associated with the display. Logic associated with the interface is capable of generating an interrupt signal for the processor based on input to the sensor. According to one embodiment, the housing is configured to removably attach to the display. In one implementation, the housing is configured to attach via snap-on to the display. The module may include a sheet metal bracket and a plastic bezel. The indicator may include a light emitting diode (LED), and the interface may comprise a USB interface.

Another embodiment to the invention is directed to a security system. The security system includes a graphic display, fingerprint sensor, camera and microphone. The sensor, camera and microphone are coupled to the transaction terminal. The camera is positioned to take an image of a user who provides the human fingerprint and is positioned to receive sound from the user who provides the human fingerprint. Also included is storage for storing information obtained from the sensor, the camera and the microphone. Logic is provided to authenticate users based on information received from the sensor. A computer processor is included, and the computer processor is operable with the storage and the logic to authenticate users. The system may include logic to cause the image of the user to be displayed at a later time, after the fingerprint has been initially provided, in connection with fingerprint data being received from the user for authentication.

Another embodiment of the invention is directed to a system including a first terminal and a second terminal. The first terminal includes a biometric sensor and an input device. The input device may include a camera, microphone, other input device or combination thereof. The second terminal includes a second biometric sensor and an output device. The second terminal also includes logic to cause the output device to output data received from the input device associated with biometric data received from the first terminal. The data is output in response to a match with biometric data obtained at the second terminal. According to one embodiment, the first terminal includes a display with a touch screen and logic to provide tickets. According to another embodiment, the first terminal is coupled to an airline reservation system. The airline reservation system is a system that reserves space on an airplane and checks whether such a space may be available with a central resource associated with an airline or airlines.

Another embodiment of the invention is directed to a method of operating a security system. Information is received from a user's fingerprint from a sensor coupled to a display. An image is received from the user from a camera located proximate to the display and sensor, and the information from the fingerprint and the image are associated. Upon a later request from the user to engage in a transaction, information is received from the user's fingerprint from a sensor. The image of the user is displayed based on a match between the recently received information from the user's fingerprint with the earlier obtained information from the fingerprint associated with the image.

In one embodiment, the information from the user's fingerprint is received from the sensor coupled to the display at a first terminal, and upon the later request from the user to engage in the transaction, the information from the user's fingerprint is received and the image is displayed at a second terminal. The first and second terminals are located in different rooms according to an embodiment of the invention.

The information from the user's fingerprint may be received from the sensor coupled to the display at a first terminal. The first terminal includes electronics to provide tickets according to one embodiment. Upon the later request from the user to engage in the transaction, the information is received from the user's fingerprint and the image is displayed at a second terminal. The second terminal may include logic to process tickets dispensed from the first terminal.

Another embodiment of the invention is directed to a method of operating a system involving a user account. Commands are received from a user from a touch screen, and fingerprint data is received from the user based on a sensor located proximate to the touch screen. It is verified whether the user has an account on the system based on the fingerprint data, and if the user is determined to have an account on the system, then the user is allowed to access functions associated with the account using the touch screen. The user may be allowed to access functions not associated with an account using the touch screen if the user is determined not to have an account on the system. According to an embodiment, the account comprises a bank account, and the functions restricted to authenticated users include withdrawal from and deposit into the account. Users not authenticated by way of biometric data may be given access to other functions such as withdrawal from another account at another bank based on verification of their card, pin number and/or other requirements.

Another embodiment of the invention is directed to a method of operating a transaction terminal. User commands are received from a touch screen. Sales transactions are processed, and information related to the sales transactions is displayed at least partially in response to the user commands. Fingerprint data is received from the user. The user is authenticated based on the fingerprint data, and a command is issued to allow access to a cash drawer based on the authentication.

Another embodiment of the invention is directed to a security mechanism. The mechanism includes a touch screen and a sensor capable of receiving information from a human fingerprint, the sensor being coupled to the display. Also included is logic to authenticate users based on comparison of information received from the sensor with previously obtained information associated with the users. Logic provides access to a door if a user is authenticated based on the comparison, or the user provides a code through the touch screen.

DETAILED DESCRIPTION

An embodiment of the invention is directed to a system with a biometric sensor to control user access to at least certain aspects of the system. In one example, the system is a transaction terminal, such as a point of sale terminal encountered in a retail environment. The biometric sensor may be a fingerprint sensor, and the system allows access to certain aspects of the system, such as opening the cash drawer, only upon authentication of the user through the fingerprint sensor. One embodiment of the invention is directed to a removable module with a sensor. The removable module can be attached to a display. An audit trail of access to the system may be created along with corresponding data received from the sensor. Different users may have access to different particular operations in the system, and identification of the different users by way of the biometric sensor allows for the system to control such access by the different users.

Figure 1A:
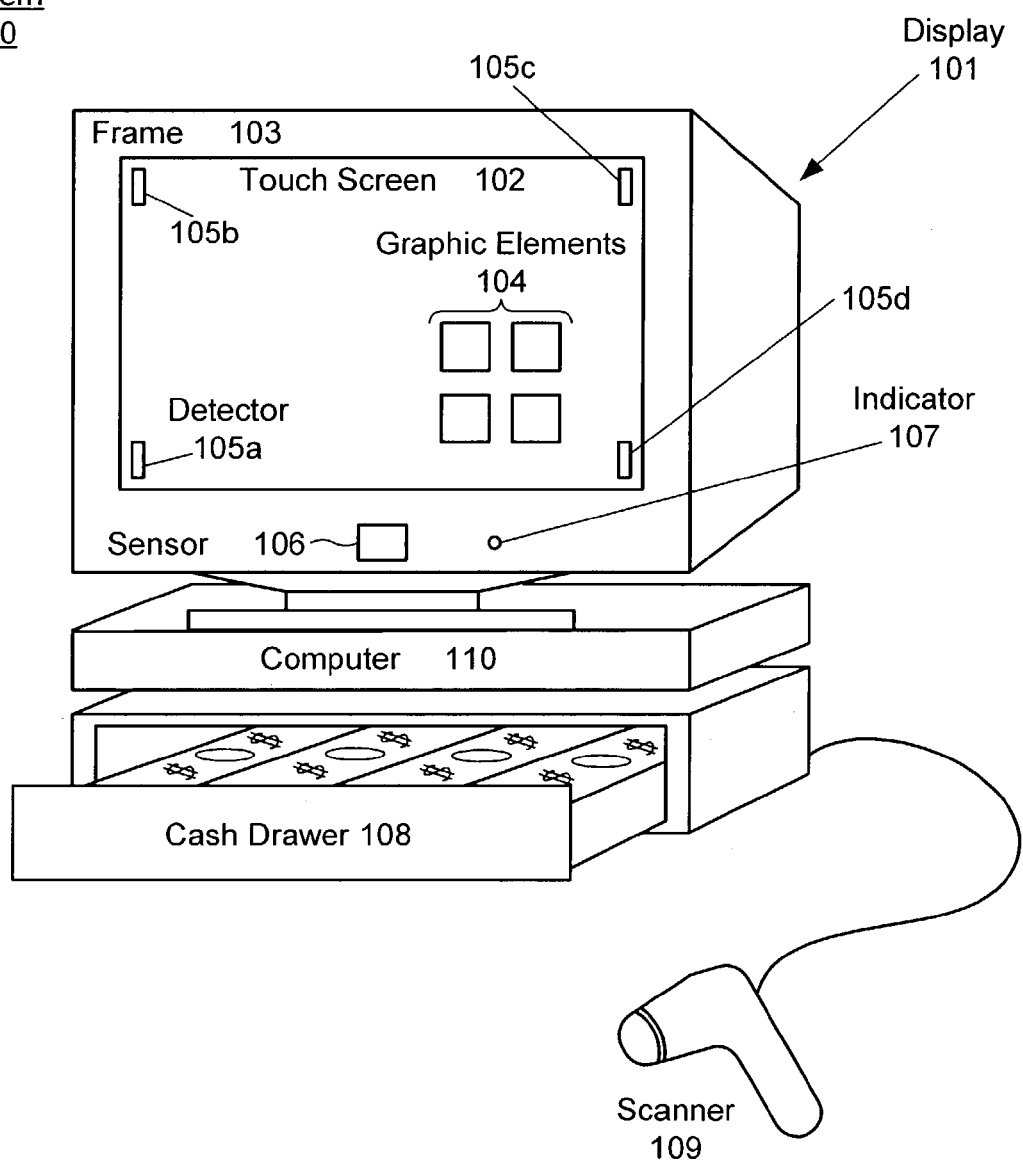
FIG. 1A is a drawing of a transaction terminal with touch screen, scanner, cash drawer and sensor, according to an embodiment of the invention.

FIG. 1A is a drawing of a transaction terminal with touch screen, scanner, cash drawer and sensor, according to an embodiment of the invention. FIG. 1A shows a system 100 which includes display 101, scanner 109, cash drawer 108 and computer 110. Display 101 includes frame 103, touch screen 102, sensor 106 and indicator 107. Touch screen 102 includes graphical elements 104 and detectors 105a-105d.

Frame 103 surrounds and supports touch screen 102. Graphical elements 104 are displayed on touch screen 102, and detectors 105a-105d are positioned so as to detect a user touching elements on touch screen 102 such as elements among graphical elements 104. Sensor 106 is located on display 101, such as, as shown here, on a portion of frame 103 lower than touch screen 102. Indicator 107 is also located on frame 103. According to other embodiments, sensor 106 may be located at other positions on display 101. For example, sensor 106 may be located to the user's right or left on frame 103. An additional sensor may also be attached to display 101, such as in a configuration in which a sensor is on the right, and another sensor is on the left side of frame 103. Indicator 107 may comprise a light source such as a light-emitting diode (LED), or other output that can indicate status, such as whether a user has been authenticated by sensor 106. Display 101 is coupled to computer 110. Scanner 109 and cash drawer 108 are also coupled to computer 110.

In a typical use, a user conducts sales transactions with system 100. The user conducts sales transactions by selecting various graphical elements 104 on touch screen 102. Detectors 105a-105d detect touch in different locations on screen 102 thus enabling the user to use screen 102 as a touch screen. Other touch screen technology may be used according to various implementations. A user may optionally use scanner 109 to obtain input, such as through scanning bar codes from merchandise. At particular points during the operation, system 100 requires that user authenticate him or herself. In order to provide such authentication, the user places a finger on the sensor 106. System 100 authenticates the user based on information obtained from sensor 106. For example, computer 100 compares fingerprint data obtained from sensor 106 with previously obtained fingerprint data to determine the identity of the user and, based on information stored about the user, determines whether the user may have permission for a particular operation in system 100. For example, another biometric sensor other than a fingerprint sensor may be used according to other embodiments. In one embodiment, access to cash drawer 108 requires that a user be authenticated via sensor 106. The user operates system 100 through touch screen 102. When the user reaches a point at which the user desires to obtain access to cash drawer 108, the user places a finger on sensor 106. After authentication, the user is then granted access to cash drawer 108. The operation of the transaction terminal process and authentication is controlled by computer 110, according to one implementation. Separate computer programs may be used in computer 110 for control of the transaction terminal operations and authentication of the user.

The teachings of FIG. 1A are applicable to transaction terminals other than point of sale systems. For example, elements of FIG. 1A may be applied to embodiments of the invention comprising an automatic teller machine (ATM), system at a boarding gate in an airport terminal or building locking mechanism. For example, in an ATM, display 101 may represent the display of the ATM system, and computer 110 may represent a computer in the ATM system that controls various functions of the ATM. Cash drawer 108 may be replaced with a mechanism in the ATM for providing cash to the user at the appropriate moment after the appropriate steps of authentication have occurred. In an airport security terminal, other mechanical device or input output mechanism instead of cash drawer 108 may be included to provide security function based on authentication. For example, an output device displaying the status of authentication of customers may be provided in an airport security system. In a building locking mechanism, access may be provided to the building, or a lock may be unlocked, if a user is authenticated through a fingerprint identification or if the user provides a correct temporary access code.

Figure 1B:
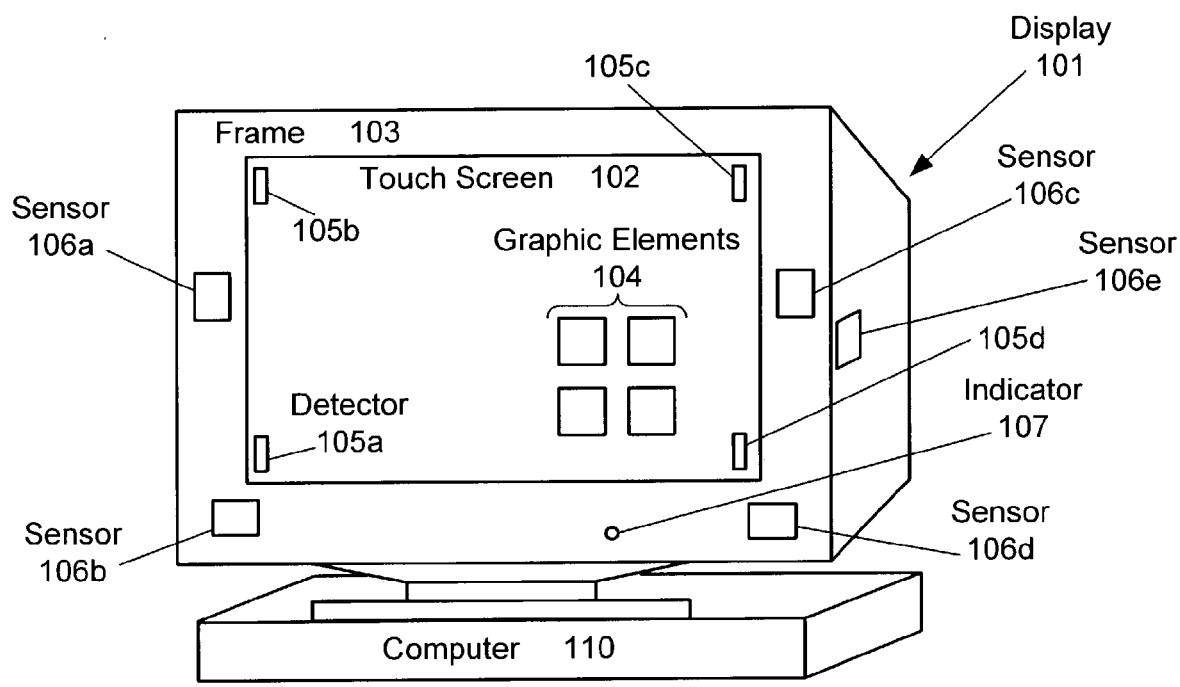
FIG. 1B is a drawing of a system with a touch screen, according to an embodiment of the invention.

FIG. 1B is a drawing of a system with a touch screen according to an embodiment of the invention. Shown in FIG. 1B are display 101 and computer 110. Display 101 may include detectors 105a-d a possible implementation of touch screen technology. A sensor may be integrated with display 101 by placement on different portions of display 101. For example, a sensor may be integrated with display 101 by placement on different locations on frame 103. As shown, sensors 106a-106d are placed in different possible locations for sensors on display 101. For example, sensor 106a is shown on the left hand side of frame 103. In such a location, the sensor is located on the user's left hand side of the screen so that a user may be able to place a finger from a left hand on sensor 106a while continuing to view the screen. Sensor 106b is located on the left side of a portion of display 101 lower than screen 102. Sensor 106c is located on the right hand side of screen 102, and sensor 106d is located on the right hand side of display 101 on a portion lower than screen 102. According to one embodiment, a sensor is placed such that it may be touched by the user while the user continues to view the screen. A sensor may be located on a plane essentially parallel to the plane of the screen, as shown with sensors 106a-d. Alternatively, it may be placed on a side of the display in a plane substantially perpendicular to the plane of the screen, as shown with sensor 106e. According to other embodiments of the invention, a sensor may be integrated with display 101 in other locations.

In one embodiment of the invention, a sensor is integrated with touch screen 102 such that a user is able to touch a graphic element of touch screen 102 while simultaneously having biometric data recorded from the same finger that user uses to touch screen 102. In a system with such a configuration, various steps of operation may require authentication of the user via the biometric data obtained as the user touches the screen. Every operation requiring touch may involve an authentication using such biometric data. Alternatively, selected operations may require such authentication. In such a system, elements among graphical elements 104 also operate as sensors to obtain biometric data.

Figure 2:
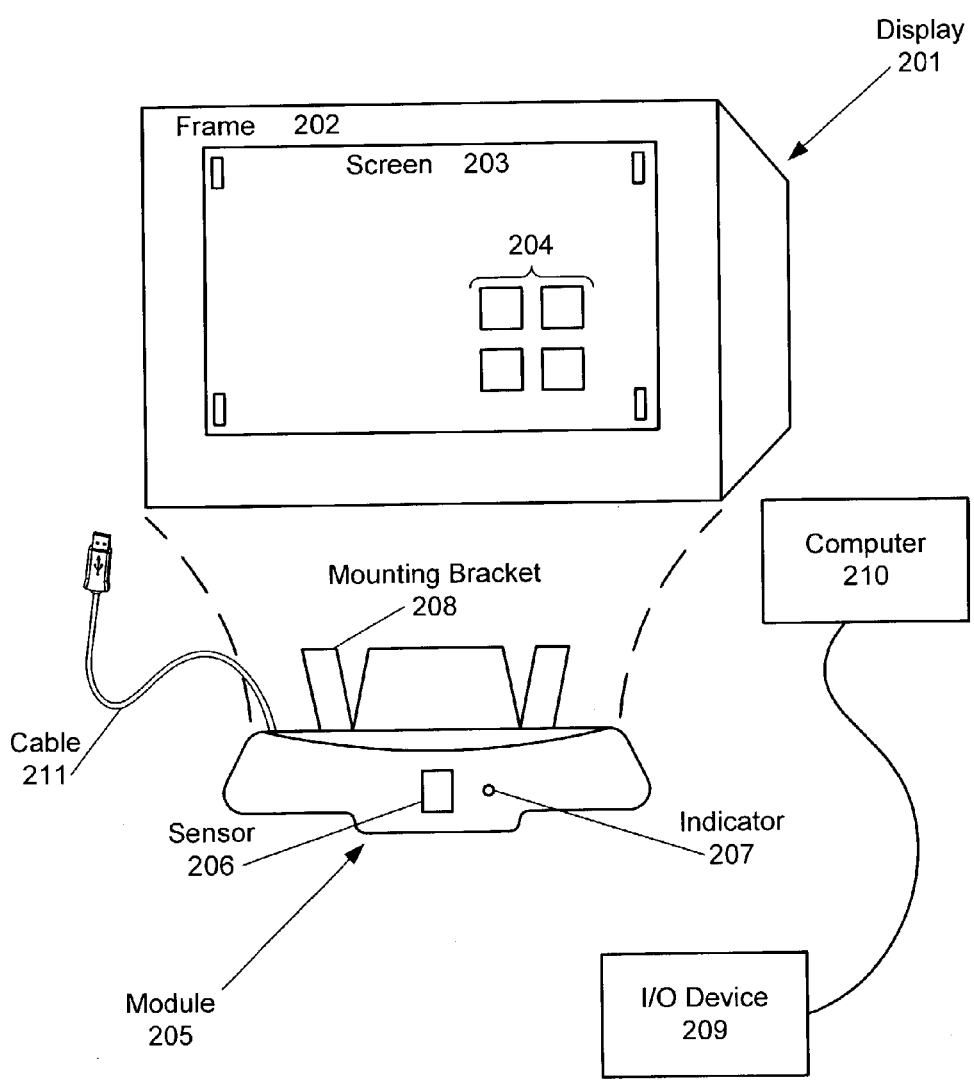
FIG. 2 is a drawing of a removable module with mounting bracket, sensor, indicator, and cable, according to an embodiment of the invention.

FIG. 2 is a drawing of a removable module with mounting bracket, sensor, indicator, and cable, according to an embodiment of the invention. Shown in FIG. 2 is system 200 which includes display 201, computer 210, I/O device 209 and module 205. Display 201 includes screen 203 and frame 202. Screen 203 includes graphical elements 204. Module 205 includes sensor 206, indicator 207, mounting bracket 208 and cable 211. Module 205 may be attached to display 201 with the help of mounting bracket 208. Cable 211 attaches to computer 210. I/O device 209, which may comprise a device such as a scanner, as used in a point of sale system, is coupled with computer 210. Display 201 is also coupled with computer 210. Module 205 may be coupled with display 201 via a snap-on configuration. Mounting bracket 208 helps to make such a snap-on attachment possible.

In operation, sensor 206 in module 205 is used to authenticate users. When module 205 is attached to display 201, a user can easily reach sensor 206 while still viewing screen 203. Computer 210 can carry out authentication operations with respect to the user based on data received via sensor 206. Computer 210 receives such information from sensor 206 through cable 211. According to one embodiment of the invention, cable 211 is a USB cable. Accordingly, module 205 also includes a USB interface. In one embodiment of the invention, module 205 is removably attached to display 201 such that module 205 may be easily attached to and removed from display 201. For example, module 205 may be attached to display 201 in the field, such as in an existing customer's location. Some reprogramming of computer 210 may occur to accommodate module 205. However, in one implementation, application software and computer 210, such as point of sale application software, is not modified in order to accommodate the operation of module 205.

Figure 3:
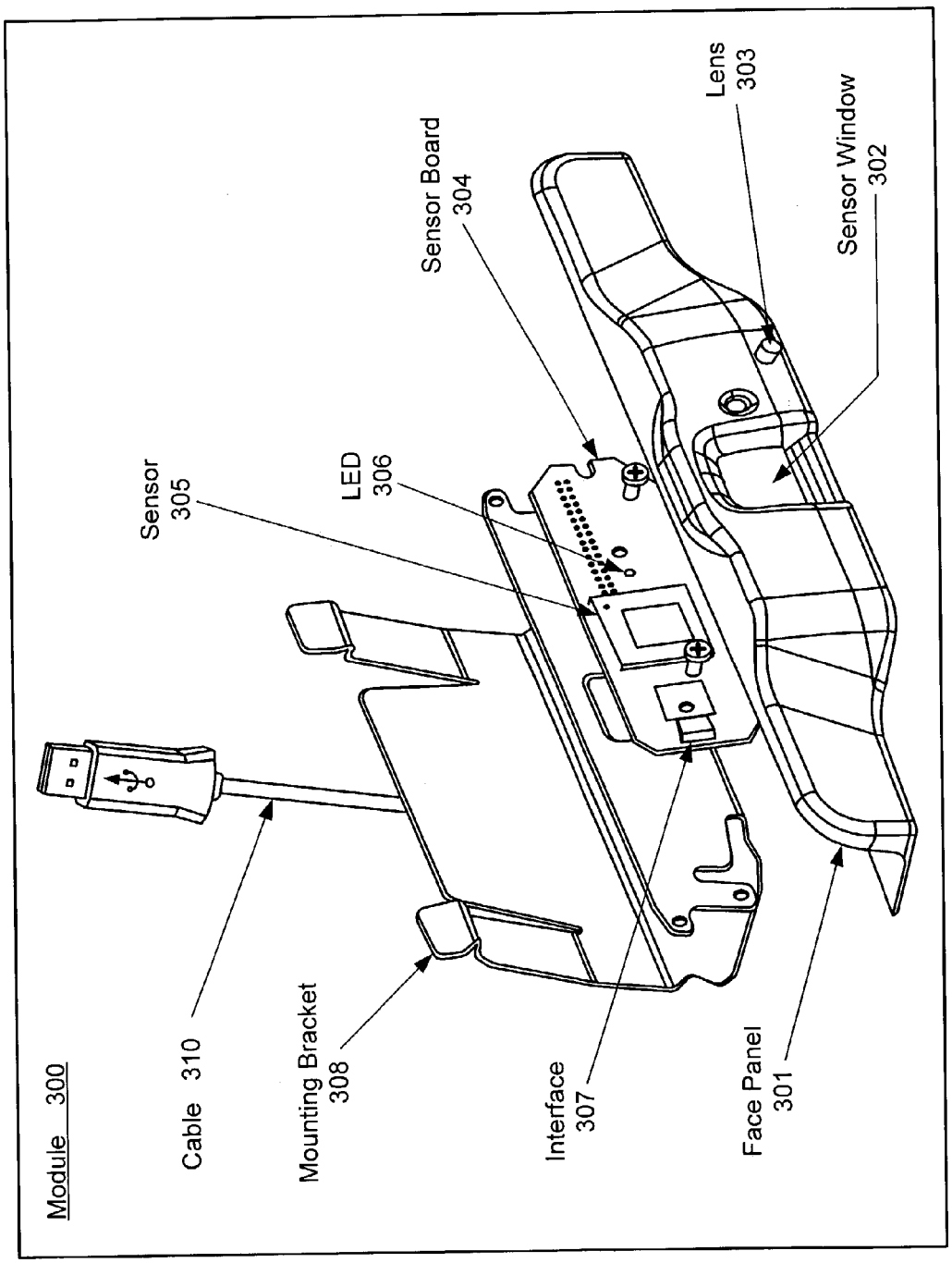
FIG. 3 is an exploded view of a module with sensor, LED, interface and cable, according to an embodiment of the invention.

FIG. 3 is an exploded view of a module with sensor, LED, interface and cable, according to an embodiment of the invention. Module 300 includes face panel 301, sensor board 304, mounting bracket 308, and USB cable 310. Face panel 301 includes LED lens 303 and sensor window 302. Sensor board 304 includes LED 306, touch sensor 305 and interface 307. Sensor 305 comprises a solid-state capacitive sensor, including a two-dimensional array of metal electrodes in a sensing array. Further, sensor 305 may be manufactured in standard CMOS technology. In one implementation, sensor 305 comprises a 256×300 sensor array that has a 50 µm pitch and yields a 500-dpi image. In one particular embodiment, a sensor is selected that yields an image having a density of at least 500-dpi. In other embodiments, other fingerprint sensor or other biometric sensor technology is used. Face panel 301 may comprise a plastic bezel. Sensor window 302 may comprise an opening which allows a user to directly contact sensor 305 through sensor window 302. Interface 307 is electrically coupled to touch sensor 305 and cable 310. Interface 307 allows communication between sensor 305 and another system by way of cable 310. According to one implementation, interface 307 comprises a USB interface, and cable 310 comprises a USB cable. Sensor board 304 is attached to mounting bracket 308. Face panel 301 is attached to mounting bracket 308 to form a module along with sensor board 304. Module 300 can be attached to another device such as a display. For example, module 300 may be attached to a touch screen display in a transaction terminal such as a point of sale system, ATM or other system. Sensor 305 communicates with an attached computer system through interface 307 and cable 310.

LED 306 is visible through LED lens 303. When the computer system determines whether the user is authenticated, an appropriate signal is sent to LED 306 indicating the status of such authentication. For example, LED 306 may be signaled to turn green if the user is authenticated, red if the user is not authenticated, and yellow if the system is still processing. Alternatively, LED 306 may be signaled to turn yellow if image data acquired is insufficient to analyze the fingerprint. The configuration of module 300 helps to allow for a removably attached module with a sensor to connect with a computer system.

Figure 4:
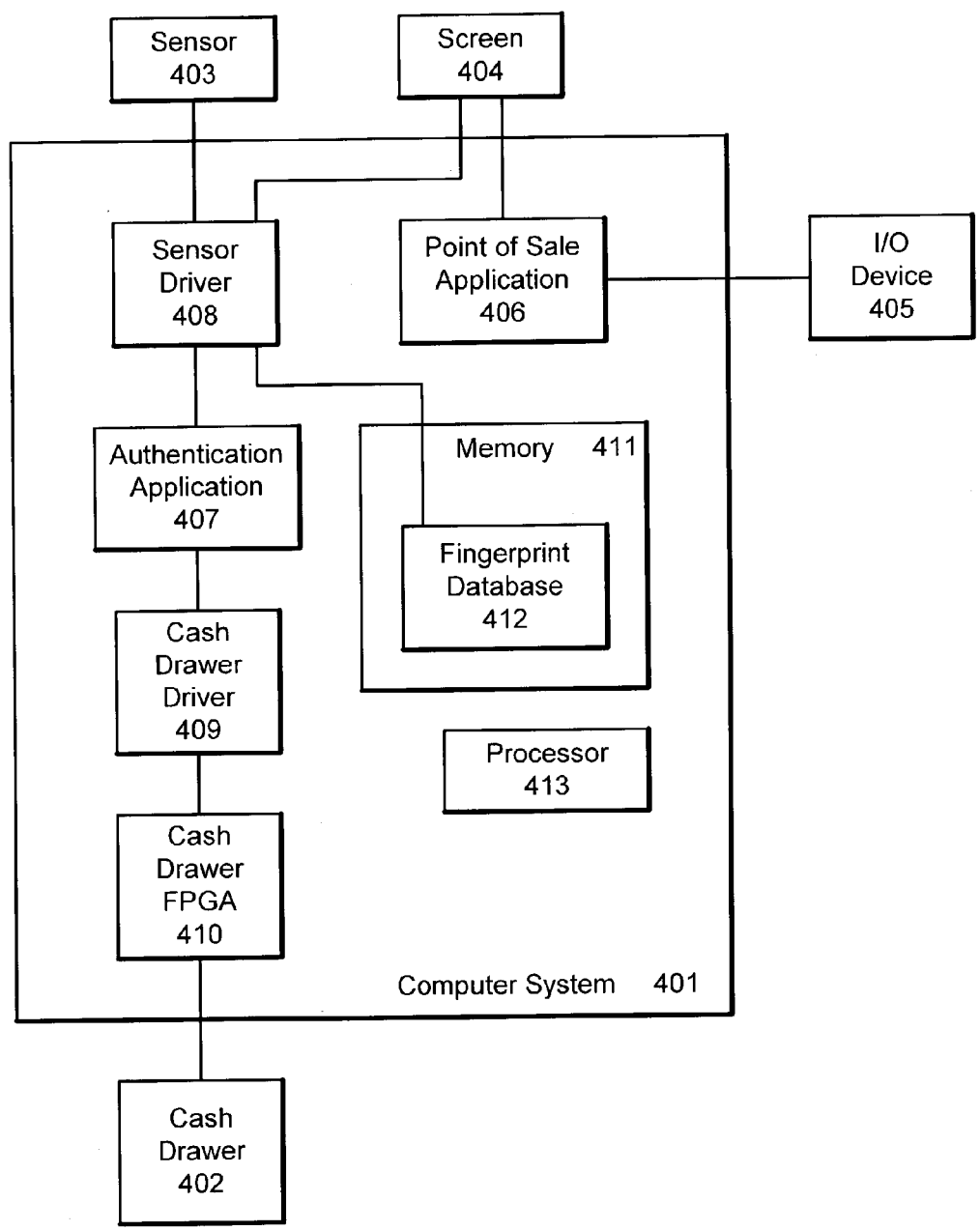
FIG. 4 is a block diagram of a system showing logical blocks within computer system, according to an embodiment of the invention.

FIG. 4 is a block diagram of a system showing logical blocks within the computer system, according to an embodiment of the invention. System 400 may be used, for example, in system 100 of FIG. 1A. System 400 includes computer system 401, cash drawer 402, sensor 403, screen 404 and I/O device 405. Computer system 401 includes an authentication application 407, transaction terminal application 406 and processor 413. Also included in computer system 401 are sensor driver 408, cash drawer driver 409, cash drawer field program rule gate array (FPGA) 410 and memory 411. Memory 411 includes fingerprint database 412.

Authentication application 407 is coupled with sensor driver 408, cash drawer driver 409 and memory 411. Sensor driver 408 is coupled with sensor 403, and cash drawer driver 409 is coupled with cash drawer FPGA 410. Cash drawer FPGA 410 is coupled with cash drawer 402. Authentication application 407 and transaction terminal application 406 are each coupled with screen 404. Note that communication between the various elements shown may take place via intermediate logic or software. For example, authentication application 407 and transaction terminal application 406 may communicate with screen 404 through an operating system running on processor 413 of computer system 401. Similarly, transaction terminal application 406 may communicate with I/O device 405 via operating system calls.

Cash drawer FPGA 410 may comprise an FPGA typically found in a point of sale (POS) terminal. According to one implementation, cash drawer FPGA 410 is reprogrammed to allow access to cash drawer 402 only if a particular instruction or set of instructions are received. For example, according to one implementation, cash drawer FPGA 410 allows access to cash drawer 402 only if a particular series of instructions are received from cash drawer driver 409. Authentication application 407 causes cash drawer driver 409 to send such a sequence of instructions to cash drawer FPGA 410 if a user has been authenticated and is authorized to access cash drawer 402. Note that although an embodiment is shown with applicability to a point of sale terminal, the architecture disclosed in and discussed with respect to FIG. 4 may be applicable in other transaction terminals such as ATMs, airport security terminals, building access terminals and other transaction terminals according to various embodiments of the invention. Thus, transaction terminal application 406 may represent a point of sale application in a point of sale terminal or other appropriate application software in other types of terminals such as ATMs, airport security terminals or building access systems.

Authentication application 407 performs authentication based on information from sensor 403 received by sensor driver 408. Authentication application 407 compares data received from sensor 403 with data in fingerprint database 412, which is contained within memory 411. If a match is found to a particular degree of confidence, then the user is considered to have been authenticated. The degree of confidence is configurable, according to one embodiment of the invention. As shown, authentication application 407 and transaction terminal application 406 may be implemented separately from each other, as separate software modules or separate electronic circuitry. In an alternative implementation, authentication application 407 is included within transaction terminal application 406 as a single computer software program, electronic module, or other logical unit. Note that authentication application 407 and transaction terminal 406 run independently of each other, according to one embodiment of the invention. For example, a user may complete operation with some portion of the transaction terminal application and then need to access an item regulated by the authentication application. At this point the user places a finger on the sensor to activate the authentication application, and the authentication application authenticates the user. According to an alternative embodiment of the invention, authentication application 407 and transaction terminal application 406 communicate with each other. For example, authentication application 407 may perform an authentication in response to a request from transaction terminal application 406.

Although portions of system 400, such as authentication application 407 and transaction terminal application 406 may be implemented as computer readable software code instructions, such applications may be alternatively implemented in electrical circuitry, programmable logic or other electronic or logical implementation. Such applications may be referred to generally as "logic," which is implemented in electronic, software, combined software and hardware, or other form.

Figure 5:
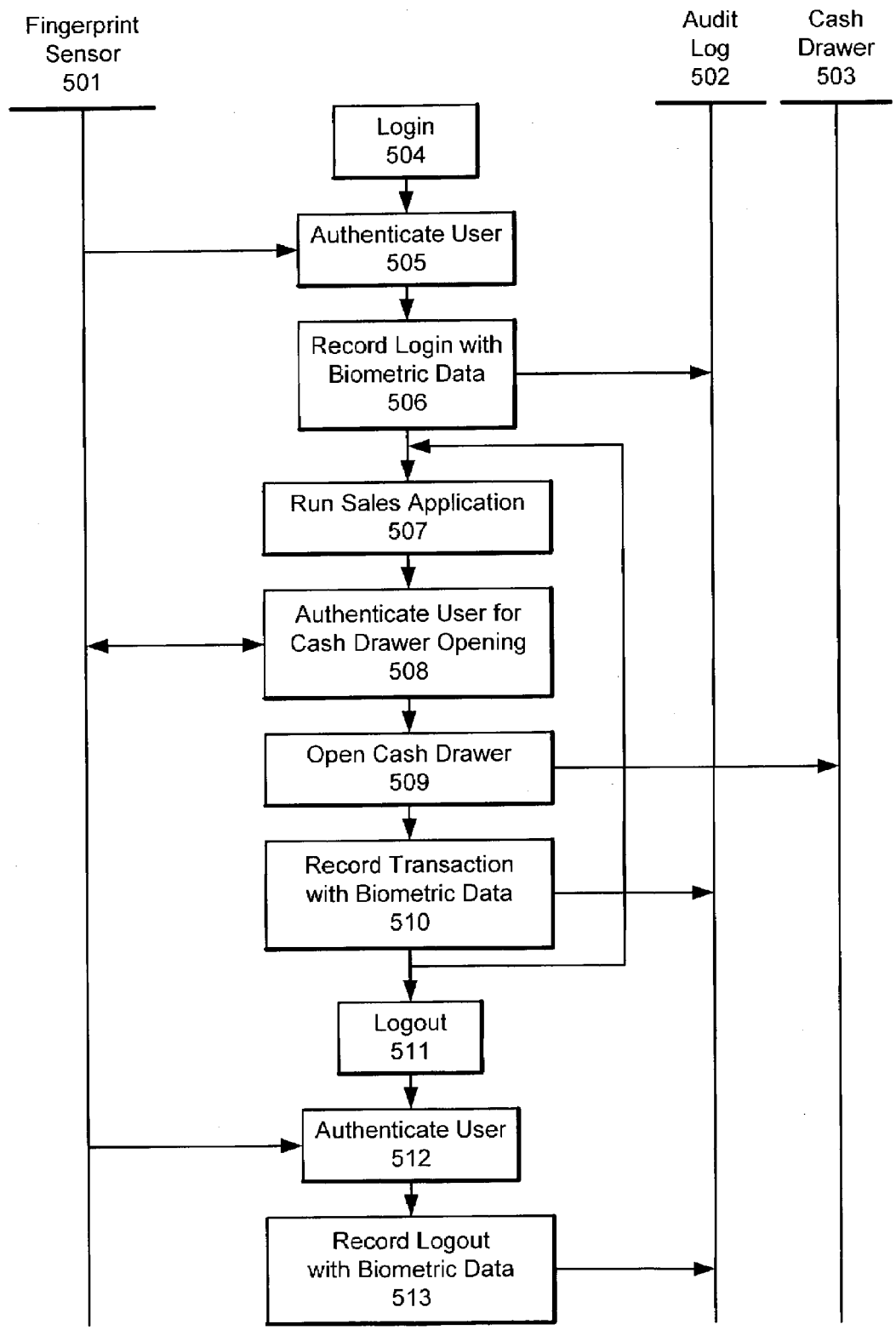
FIG. 5 is a flow diagram of operation of a transaction terminal, according to an embodiment of the invention.

FIG. 5 is a flow diagram of operation of a transaction terminal, according to an embodiment of the invention. Operation of the transaction terminal is shown including communication with fingerprint sensor 501, storage of data in an audit log 502 and operation of a cash drawer 503. A user begins interaction with the system via a log-in (block 504).

On power up, for example, a till program may invoke an applet controlling user long-in. This applet may require the user to place a finger on the fingerprint sensor. Thus, biometric data is obtained from the user, and the user is authenticated (block 505). The log-in is recorded in audit log 502 along with biometric data received from fingerprint sensor 501 (block 506). After the log-in process, a sales or other application is run (block 507). An aspect of operation of the system, such as a secure feature of the sales application may require authentication of the user (block 508). An example operation is opening of the cash drawer. The operation may comprise other action, such as a manager override of a sales transaction. The user is authenticated based on biometric data received from fingerprint sensor 501. After authentication, the respective operation may occur, such as opening the cash drawer (block 509). The operation is recorded in audit log 502 along with the biometric data received (block 510). The user may continue to operate the system (block 507). After completing operation of the system, the user may log out (block 511). The log-out process may involve requesting authentication of the user (block 512). Accordingly, data is again received from fingerprint sensor 501. The log-out is recorded in audit log 502 along with the biometric data received from fingerprint sensor 501 (block 513).

Thus, an embodiment of the invention allows for authentication at various stages of a user's interaction with the system, such as during log-in, various operations such as opening a cash drawer, and log-out. An audit log 502 is created in which aspects of the operations are recorded along with the user's biometric data received at the various stages. In an alterative implementation, the audit log stores indications that the user has been authenticated in the various stages without specifically storing the new biometric data received at each authentication. Audit log 502 may be made available to time accounting software to help provide time accounting for employee workshifts or other activities. An embodiment of the invention includes logic that tracks and reports employee attendance based on the activity recorded in connection with the biometric sensor, as may be recorded in audit log 502.

Figure 6:
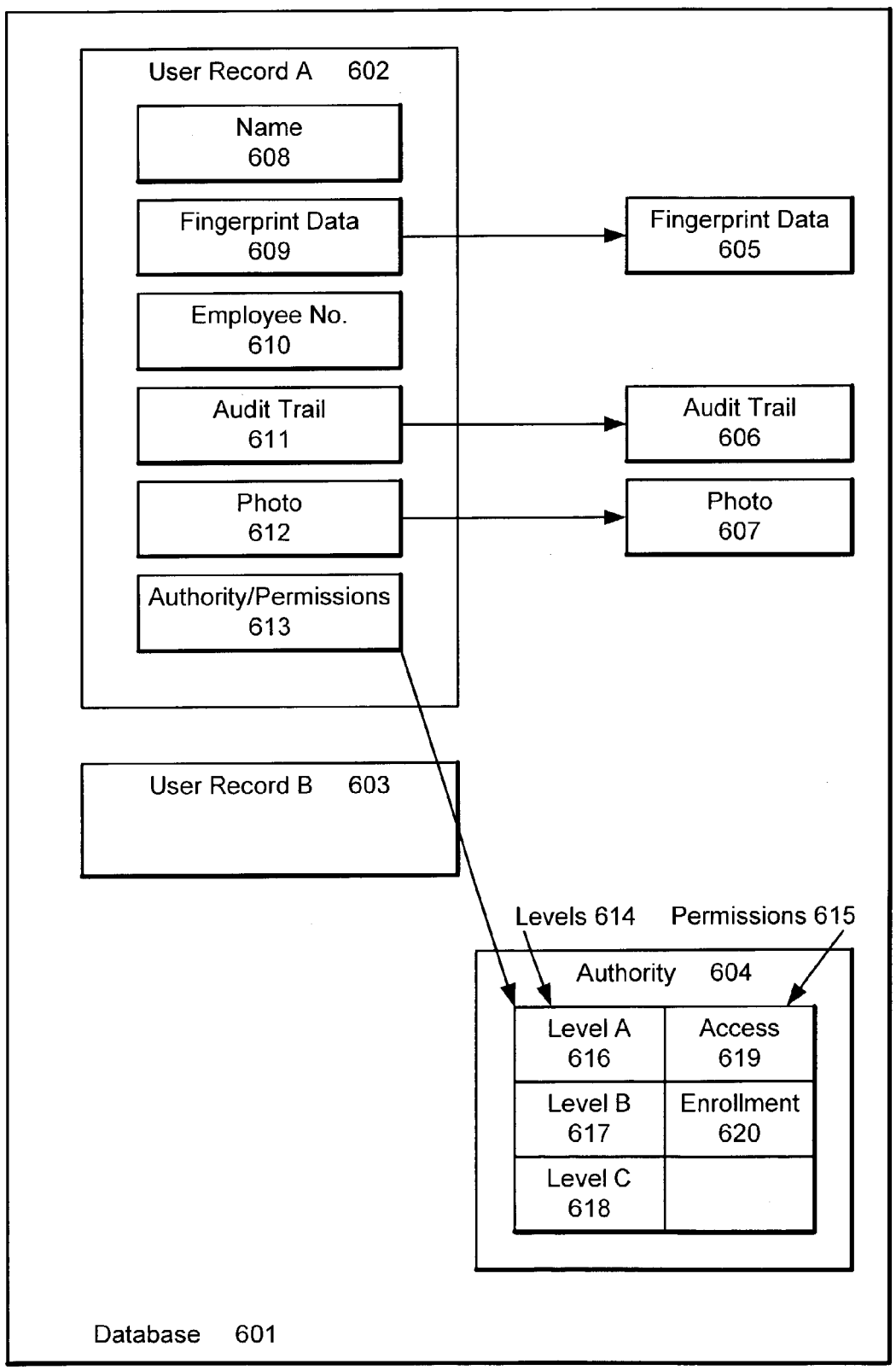
FIG. 6 is a block diagram of a database with records, according to an embodiment of the invention.

FIG. 6 is a block diagram of a database with records, according to an embodiment of the invention. FIG. 6 includes database 601 which includes various items associated with authentication of users and their authority to perform selected operations in the system. The records may be implemented as objects or other data relationship. Database 601 and its records may be accessed by software such as authentication application 407, and in some implementations, transaction terminal application 406. Records are included in database 601 corresponding to respective users, such as user record A 602 and user record B 603. User records contain various items of information associated with respective users. For example, as shown in user record A 602 the following fields are included: name 608, fingerprint data 609, employee number 610, audit trail 611, photo 612 and authority/permissions 613. A subset of these fields, or additional fields, may be included according to other implementations. The fields may provide links to other records or objects in database 601 including the respective information. For example, the fingerprint data 609 field includes a link to fingerprint data record 605 in one implementation. Similarly, audit trail 611 includes a link to audit trail record 606, and photo 612 includes a link to photo record 607. Audit trail record 606 may include a record of activity performed by user 602 in operation of the respective system. Audit trail record 606 may include biometric data received in connection with the various operations taken by the respective user. Fingerprint data 605 record may include a fingerprint image or images received from respective a user, particularly during the enrollment process.

Authority table 604 shows the relationship between the various levels 614 and corresponding permissions 615. Such table may be included in a different part of the system rather than in database 601. Software, such as authentication application 407, allows users to operate a system in accordance with authority table 604. As shown in exemplary authority table 604, levels A 616, B 617, and C 618 are included. Each level has respective permissions allowed. For example, level A 616 is associated with permission access 619 and Level B 617 is associated with permission enrollment 620. Accordingly, authority/permissions 613 field of user record A 602 may include a link to the respective authority level associated with user, record A 602. As shown, authority/permissions field 613 is linked to level A 616, which has "access" permission 619. Thus, the user associated with the user record A 602 has access authority. In one implementation, such authority may be authority to access a cash drawer of a point of sale system.

Figure 7:
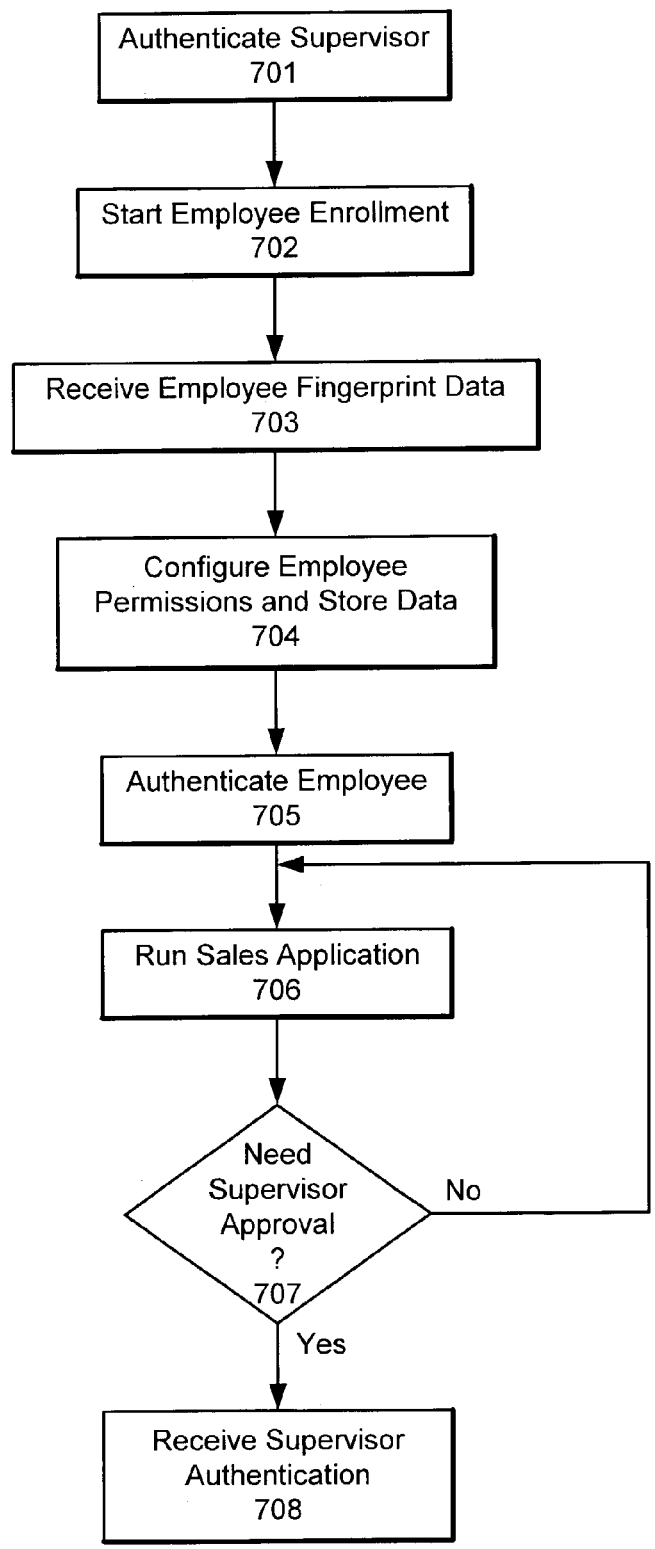
FIG. 7 is a flow diagram showing enrollment and supervisor authorization, according to an embodiment of the invention.

FIG. 7 is a flow diagram showing enrollment and supervisor authorization, according to an embodiment of the invention. FIG. 7 helps illustrate different levels of authority that may be provided in a system using biometric data according to an embodiment of the invention. The biometric data may be obtained, for example, from a sensor such as sensor 106 of system 100. In the example shown in FIG. 7, a supervisor level of authority is needed to enroll a new employee and to perform operations. First the supervisor is authenticated (block 701). After authentication of the supervisor, the supervisor can start employee enrollment (block 702). Employee fingerprint data is received (block 703). Employee permissions are configured by the supervisor, and the respective permissions and received fingerprint data are stored (block 704).

Later, the enrolled employee can operate the system. First the enrolled employee is authenticated (block 705). The application, such as a sales application for a point of sale system, is run (block 706). In running the application, it is possible that authentication of the employee is needed to perform particular operations, such as accessing the cash drawer or other action depending on the application. If a supervisor approval is needed (block 707), then the supervisor authentication is received (block 708). Such supervisor authentication is also received through a biometric authentication, such as the authentication performed in block 701.

Figure 8:
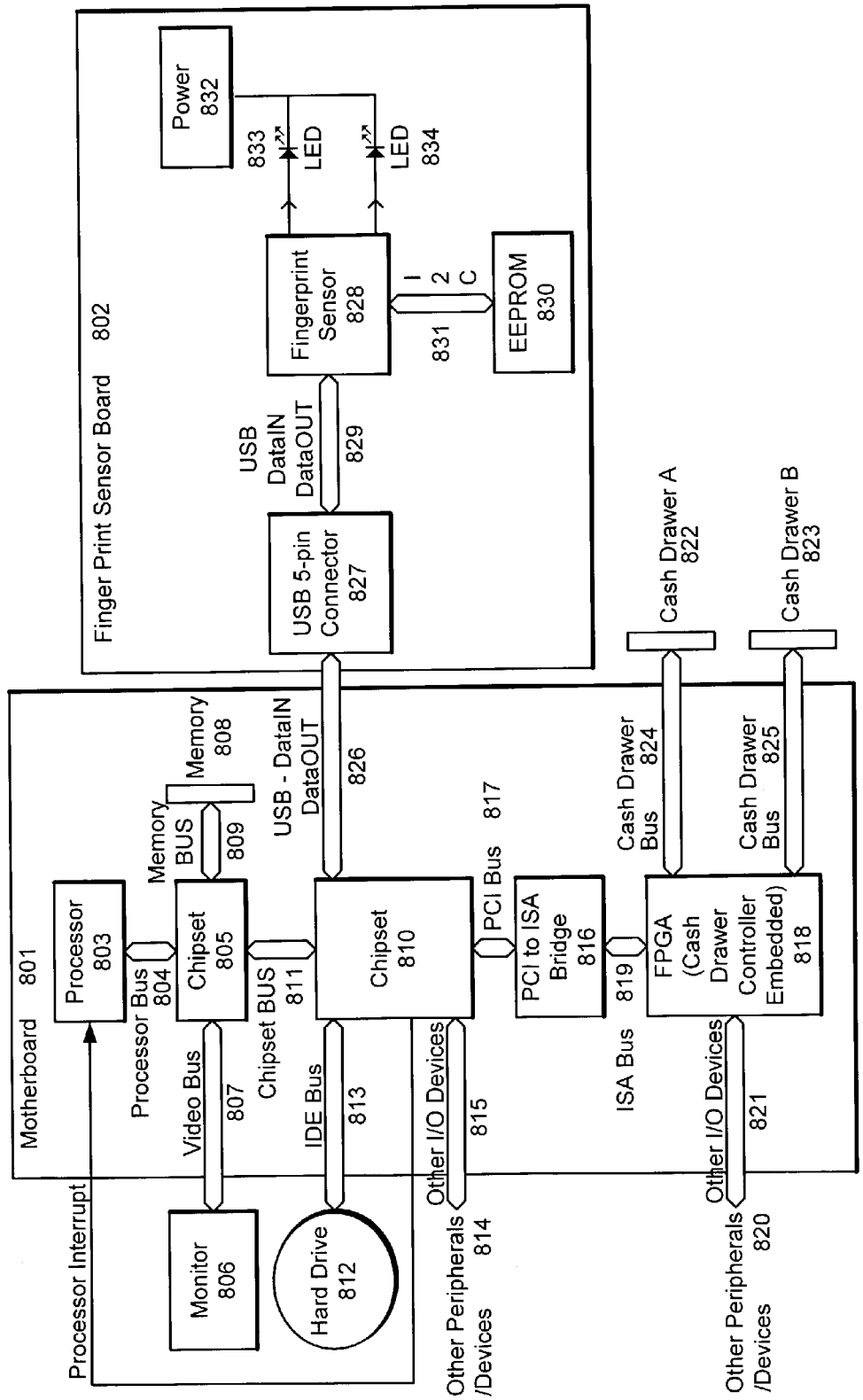
FIG. 8 is a block diagram of hardware components including a motherboard and a fingerprint sensor board, according to an embodiment of the invention.

FIG. 8 is a block diagram of hardware components including a motherboard and a fingerprint sensor board, according to an embodiment of the invention. FIG. 8 shows system 800 which includes motherboard 801 and fingerprint sensor board 802. Fingerprint sensor board 802 includes USB 5-pin connector 827, fingerprint sensor 828, power 832, pass LED 833, fail LED 834, and EEPROM 830. Also included are USB data in/data out bus 829 and EEPROM bus 831. Fingerprint sensor 828 on fingerprint sensor board 802 is coupled to USB 5-pin connector 827 via USB data in/data out bus 829 and to EEPROM 830 via EEPROM bus 831. Fingerprint sensor 828 is also coupled to pass LED 833 and fail LED 834. These LEDs are coupled to power 832.

Motherboard 801 includes processor 803, chipset 805, chipset 810, field programmable gate array (FPGA) 818 and memory 808. Also included in motherboard 801 are processor bus 804, video bus 807, memory bus 809, chipset bus 811, IDE bus 813, other I/O device bus 815, PCI bus 817, PCI to ISA bridge 816, ISA bus 819, cash drawer bus 824, cash drawer bus 825 and other I/O device bus 821. Processor 803 is coupled to chipset 805 by way of processor bus 804. Chipset 805 is coupled to monitor 806 via video bus 807, to memory 808 via memory bus 809 and to chipset 810 via chipset bus 811. Chipset 810 is coupled to a hard drive 812 via IDE bus 813, to other peripherals/devices 814 via other I/O devices bus 815, to PCI to ISA bridge 816 via PCI bus 817 and to fingerprint sensor board 802 via USB data in/data out bus 826. FPGA 818 is coupled to other peripheral devices 820 via other I/O devices bus 821, to cash drawer A 822 via cash drawer bus 824 and to cash drawer B 823 via cash drawer bus 825.

System 800 may be used in a configuration with a computer and display such as shown in FIG. 2. In such an application, motherboard 801 may be located in computer 210 and fingerprint sensor board 802 may be located in module 205. System 800 maybe used in embodiments, such as in system 100 of FIG. 1A, the system of FIG. 1B and system 400 of FIG. 4.

A data path in system 800 may start with fingerprint sensor 828. First, a finger is pressed on fingerprint sensor 828. Fingerprint sensor 828 gathers fingerprint data. Fingerprint sensor 828 sends an interrupt request over USB data in/data out bus 829 to chipset 810 by way of USB 5-pin connector 827 and USB data in/data out bus 826. Chipset 810 in turn generates an interrupt to processor 803. Processor 803 then invokes a device driver for fingerprint sensor 828 via an operating system. The device driver queries the fingerprint sensor for fingerprint data. Fingerprint data passes to chipset 810 by way of USB bus data I/O 829, USB 5-pin connector 827 and USB data in/data out bus 826. Data then passes from chipset 810 to chipset 805 by way of chipset bus 811. The fingerprint data then further passes to processor 803 by way of processor bus 804. Processor 803 queries memory 808 via memory bus 809, or hard drive 812 via IDE bus 813 in order to compare the fingerprint data received from fingerprint sensor 828 with already stored fingerprint data.

If the user is authenticated based on the fingerprint data received from fingerprint sensor 828, then a command is sent from the processor 803 to allow a cash drawer to open. This command may pass to chipset 805 by way of processor bus 804 then to chipset 810 by way of chipset bus 811 and to PCI to ISA bridge 816 through PCI bus 817. The command further passes to FPGA 818 by way of ISA bus 819. FPGA 818 then issues a command to the appropriate cash drawer to open. For example, FPGA 818 issues a command to cash drawer A 822 by way of cash drawer bus 824. Whether a particular cash drawer is opened may depend on other software in the system or may depend on the particular user who is authenticated.

Figure 9:
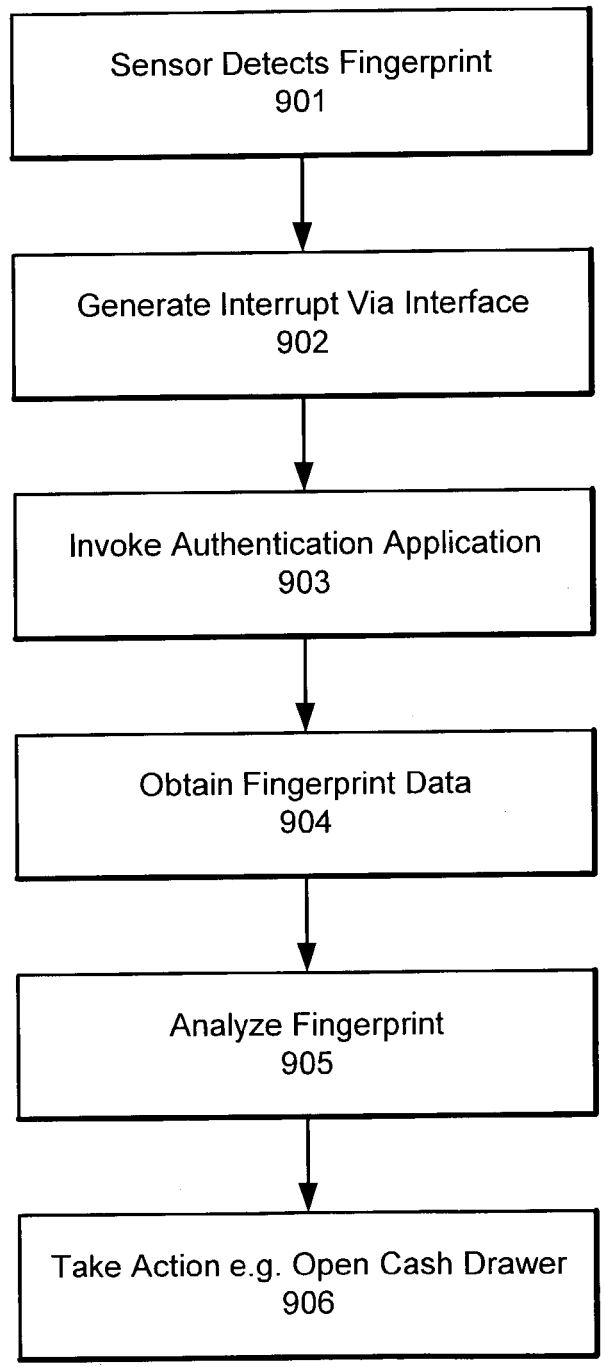
FIG. 9 is a flow diagram of operation of a system, according to an embodiment of the invention.

FIG. 9 shows a flow diagram for operation of a computer system with a fingerprint sensor. First the sensor receives fingerprint data (block 901). The sensor generates an interrupt via an interface with a processor (block 902). In response, the processor invokes an authentication application (block 903). Fingerprint data is then obtained from the sensor (block 904). The fingerprint data obtained is analyzed (block 905). Then, depending upon the analysis of the fingerprint data, the appropriate action is taken (block 906). For example, if the operator is authenticated, a cash drawer may be opened. Alternatively, if the operator is not authenticated, an authentication-failed LED may be activated.

Figure 10:
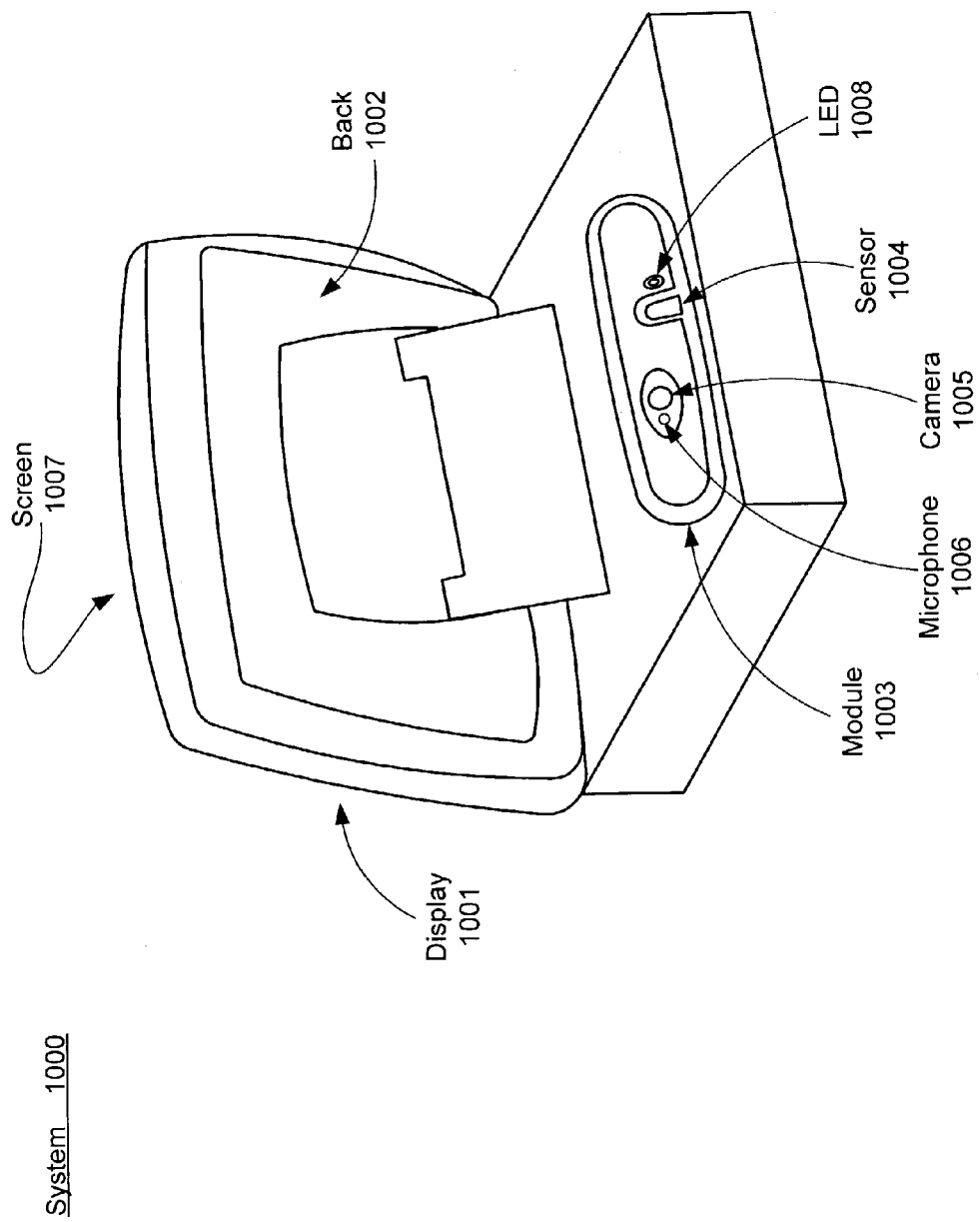
FIG. 10 is a diagram of a terminal, according to an embodiment of the invention.

FIG. 10 is a diagram of a terminal, according to an embodiment of the invention. System 1000 includes display 1001, which includes screen 1007, back 1002 and module 1003. Module 1003 is coupled to back 1002 of display 1001. Module 1003 includes camera 1005, sensor 1004, LED 108 and microphone 1006. In operation, system 1000 may be used as a security terminal. A fingerprint sensor 1004, camera 1005 and microphone 1006 are integrated with a customer display window. System 1000 may be used in applications such as airport security, immigration, creation of photo identifications, electronic signature of credit card purchases and other uses. In operation, biometric data is obtained from a user by way of camera 1005, sensor 1004, and/or microphone 1006. Alternatively, one of such inputs may be used to obtain biometric data for authentication. For example, sensor 1004 may be used to authenticate an individual accessing the system. Then the other input devices, such as camera 1005 and microphone 1006, may be used to obtain additional information for other purposes, such as the creation of an identification card or obtaining data or receiving commands to operate the system. LED 1008 may indicate success of authentication, success in obtaining a biometric sample or other signal. Display 1001 may be used to display a photo of a user authenticated through sensor 1004. The photo may have been obtained earlier from camera 1005.

Figure 11:
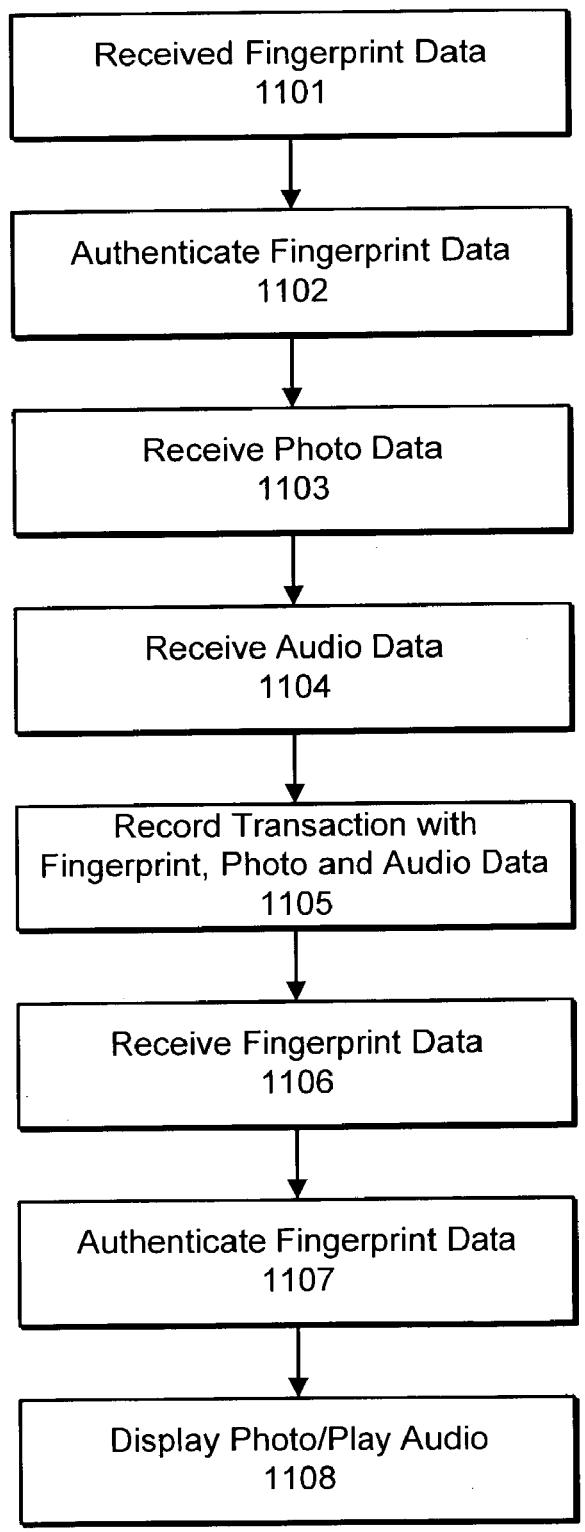
FIG. 11 is a flow diagram of operation of a security terminal, according to an embodiment of the invention.

FIG. 11 shows a flow diagram of a security terminal according to an embodiment of the invention. First the fingerprint data is received (block 1101). Next the fingerprint data is authenticated (block 1102). Other data is also received such as photo data (block 1103) and/or audio data (block 1104). The transaction is recorded with the respective data received such as fingerprint, photo and audio data (block 1105). Later, fingerprint data is received from the user (block 1106). Next, the fingerprint data is authenticated (block 1107). Based on the authenticated fingerprint data, a corresponding photo and/or audio data is displayed/played (block 1108). Such a process may allow an operator to verify that the photo data initially associated with the fingerprint data looks like that of the same individual who is later providing the fingerprint data in block 1106. According to one embodiment, the fingerprint data received according to block 1101 and the photo data received according to block 1103 and optional audio data received according to block 1104 are received in connection with the customer purchasing a ticket, such as an airplane ticket. Later, when the customer presents the ticket at the gate, the agent can verify that the customer is the same customer who purchased the ticket, according to the recorded photo data and/or audio data.

Thus, the fingerprint data may be received at one terminal, and later authentication and display of photo and/or play of the audio may take place at a different terminal. For example, the first terminal may be a terminal that provides tickets, such as a ticket vending machine. The second terminal may be located where the user later is to be authenticated, such as at the boarding gate of the airport. The second terminal may contain electronics to process tickets dispensed at the first terminal. Thus, according to one implementation, an airline agent or other security personnel can check the identity of a passenger by viewing the stored photo associated with the passenger.

According to one embodiment, biometric data, such as from a fingerprint, is obtained at a terminal such as system 1000 of FIG. 10 along with other data such as a photo and/or audio data. Later when a user is authenticated using biometric data such as a fingerprint, the other associated data obtained, such as the photo, is displayed on system 1000 or other terminal. Thus, an embodiment of the invention includes a first terminal with a biometric sensor and other input such as a camera and/or microphone. The first terminal includes, in one embodiment, a display with a touch screen. The system includes a second terminal with a biometric sensor and a display, speaker and/or other output device for displaying and/or playing data obtained at the first terminal. The second terminal includes logic to cause the data received from the first terminal and associated with a user to be displayed and/or played when the user is authenticated at the second terminal.

The second terminal may be configured similarly to system 1000 of FIG. 10. The first and second terminals may be linked by a computer network and may be located at different locations such as different rooms, different buildings, or different cities.

The first terminal may include logic to process requests for ticket(s) and provide ticket(s) to the authenticated user. The other data such as photo or audio data is obtained in connection with the transaction of providing the ticket(s). The second terminal may have logic to verify the provided ticket and display the photo and/or other data linked with the user's biometric data when the user provides the biometric data at the second terminal. The first and second terminals may have logic to provide and process, respectively, electronic tickets and/or paper tickets according to alternative embodiments. According to one embodiment, the first and second terminals have electronics capable of printing and reading airline tickets, which may be formatted in accordance with standards defined within the airline industry.

Figure 12:
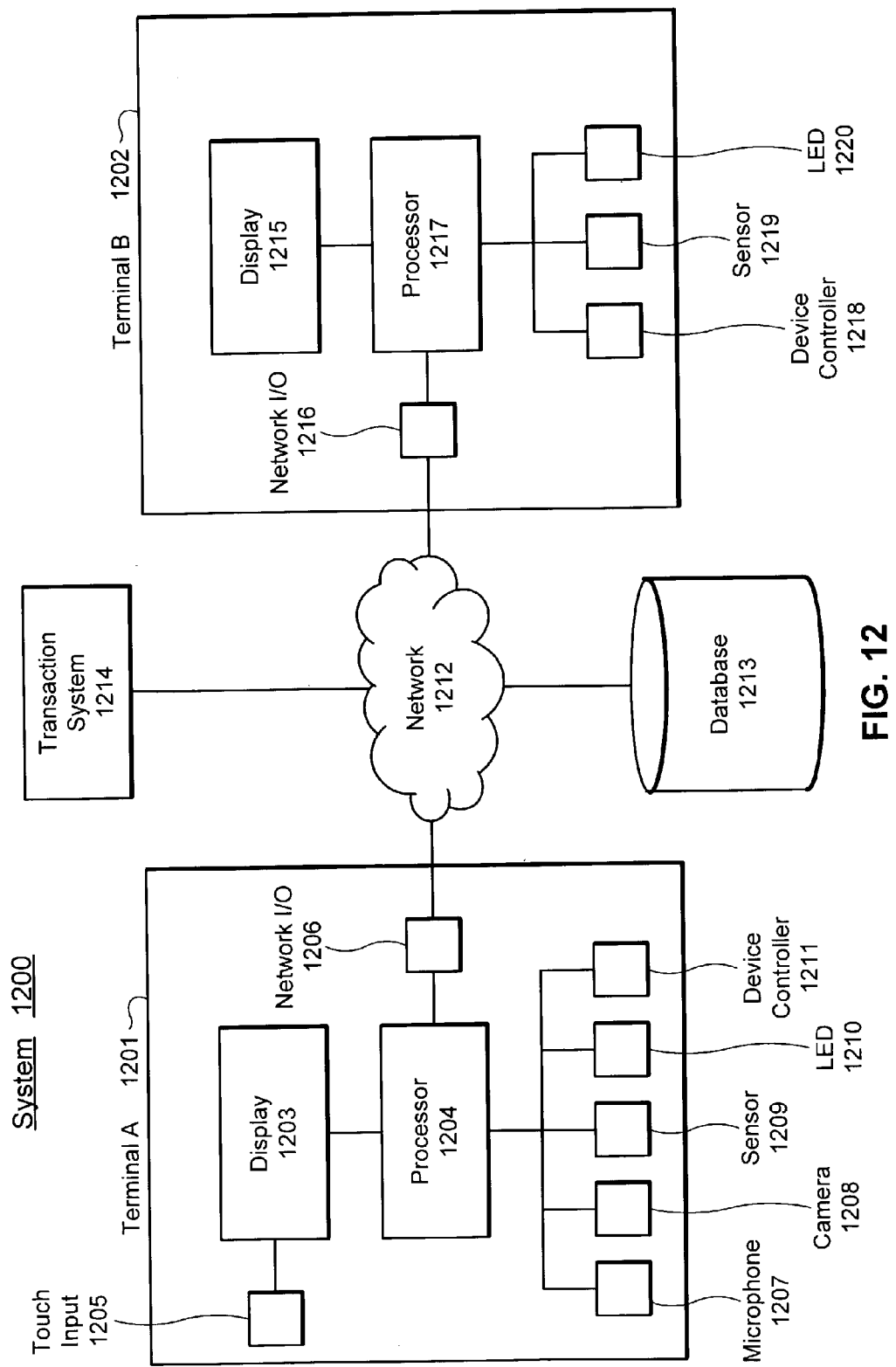
FIG. 12 shows a security system including a network according to an embodiment of the invention.

FIG. 12 shows a security system including a network according to an embodiment of the invention. Either or both terminals in FIG. 12 may, according to different embodiments, be implemented with elements from system 1000 of FIG. 10. FIG. 12 includes terminal A 1201, network 1212, terminal B 1202, database 1213 and transaction system 1214. Terminal A 1201 includes display 1203, touch input 1205, processor 1204, microphone 1207, camera 1208, sensor 1209, LED 1210, device controller 1211 and network I/O 1206. Terminal A 1201 may also include a device controlled by device controller 1211, such as a printer, reader or other device or devices. For example terminal A may include a ticket printer to print airline tickets and/or credit card reader or other device to receive payment. Other types of devices may be included in terminal A 1201. Display 1203 is coupled with touch input 1205 and processor 1204. Processor 1204 is coupled with microphone 1207, camera 1208, sensor 1209, LED 1210, device controller 1211 and network I/O 1206.

Terminal B 1202 includes display 1215, network I/O 1216, processor 1217, ticket device controller 1218, sensor 1219, and LED 1220. Terminal B 1202 may also include a device coupled to device controller 1218, such as a ticket reader or other device. Such device may be configured to operate with items provided by terminal A 1201. According to one embodiment, terminal B 1202 includes a ticket reader capable of reading tickets provided by terminal A 1201. Display 1215 and network I/O 1216 are coupled with processor 1217. Processor 1217 is also coupled with device controller 1218, sensor 1219 and LED 1220.

In operation, a user first may interact with terminal A 1201. User may interact with terminal 1201 via touch input 1205 and by viewing the instructions on display 1203. Processor 1204 controls such user interaction with terminal A 1201. Biometric data that may be obtained from the user via sensor 1209 along with other data such as a photo of the user by camera 1208 and/or an audio sample through microphone 1207. LED 1210 may be used to indicate success of obtaining the biometric data from sensor 1209. Device controller 1211 or a set of device controllers allow for processor 1204 to control a device or devices to allow functions such as providing a ticket to a user or other interaction with the user such as obtaining the credit card and reading the card. For example, a ticket printer may be included in terminal A 1201 and controlled by processor 1204 via device controller 1211.

Information obtained from the user such as biometric data may be stored in database 1213 via network 1212. The data obtained from the user such as biometric data from sensor 1209 and other data such as a photo from camera 1208, audio sample from microphone 1207 and/or other data may be stored in database 1213 in a record associated with the biometric data or otherwise associated with the user. Transaction system 1214 allows for desired transactions to occur. For example, in a case where system 1200 represents an airline system, terminal A 1201 may represent a terminal at which a user can purchase an airline ticket. In such an example, transaction system 1214 may represent the airline's reservation system or other system for coordinating reservations. According to one embodiment, transaction system 1214 comprises a system to coordinate sales and dispense goods from multiple institutions, such as from multiple airlines. Transaction system 1214 may represent other desired function, such as a system to coordinate banking transactions where system 1200 represents a banking system.

A user may later interact with terminal B 1202. Device controller 1218 may provide control of physical devices such as control of a ticket reader which may read tickets provided by terminal A 1201 or similar device. A user may provide biometric data via sensor 1219, and LED 1220 can indicate success of authentication of the user. Operation of terminal B 1202 is controlled by processor 1217. Relevant data and instructions are obtained via network 1212 via network I/O 1216. Biometric data associated with the user and other associated data such as photo, audio sample or other data may be obtained via network 1212 from database 1213. Processor 1217 can execute software to provide authentication of a user based on such biometric data and also to display or otherwise play the data associated with the biometric data. For example, where a photo has been taken from the user and associated with the user's biometric data, the photo may later be displayed on display 1215 after the matching biometric data is received via sensor 1219 and matched with a record in database 1213.

Transaction system 1214 may provide additional control or information. For example, transaction system 1214, in the case of an airline system, may verify that the passenger has a reservation on the system and provide other relevant data and/or controls. In the event that system 1200 represents another system, such as a banking system, transaction system 1214 provides other relevant data and/or control to terminal B 1202. For example, where system 1200 represents a banking system, transaction system 1214 provides terminal B 1202 with relevant controls and data related to banking, such as status of account, allowed functions, and other relevant data and/or control.

The foregoing description of various embodiments of the invention has been presented for purposes of illustration and description. It is not intended to limit the invention to the precise forms described.

What is claimed is:

1. A point of sale transaction terminal for operation by an employee user to process sales comprising:
    a display including a touch screen; a sensor physically and securely integrated into the display, the sensor receiving information from a human fingerprint from the employee user;
    a cash drawer positioned within the transaction terminal for access by the employee user while using the transaction terminal;
    means for logging on the user at the point of sale transaction terminal; means for starting a sales application after logging on the user; means for receiving transaction data from the sales application; authentication means for receiving a request from the sales application and for authenticating the user using a fingerprint from the sensor means in response to the request; cash drawer opening means for opening the cash drawer in response to the authentication means; means for recording the transaction data and fingerprint data from sensor and for transmitting the recorded data to a memory.

2. The transaction terminal of claim 1, wherein the sensor comprises a solid state capacitive sensor.

3. The transaction terminal of claim 1, wherein the sensor yields an image having a density of at least 500 dots per inch (dpi).

4. The transaction terminal of claim 1, wherein the access control logic does not communicate with the sales transaction processing logic; and
    wherein the access control logic includes programmable logic, and the system includes bios instructions to cause the programmable logic to allow access to the cash drawer in response to a determination by the access control logic that a user is authenticated; and
    wherein the access control logic comprises a field programmable gate array (FPGA).

5. The transaction terminal of claim 1, wherein the access control logic consists entirely of hardware.

* * * * *